United States Patent
Mizoguchi

(10) Patent No.: US 10,689,033 B2
(45) Date of Patent: Jun. 23, 2020

(54) VEHICLE DRIVING ASSIST APPARATUS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 36 days.

(21) Appl. No.: 16/246,090

(22) Filed: Jan. 11, 2019

(65) Prior Publication Data

US 2019/0300053 A1    Oct. 3, 2019

(30) Foreign Application Priority Data

Mar. 27, 2018  (JP) .................................. 2018-060104
Sep. 28, 2018  (JP) .................................. 2018-184748

(51) Int. Cl.
*B62D 15/02* (2006.01)
*B60W 30/18* (2012.01)
(Continued)

(52) U.S. Cl.
CPC ... *B62D 15/0255* (2013.01); *B60W 30/18163* (2013.01); *B60K 31/0008* (2013.01);
(Continued)

(58) Field of Classification Search
None
See application file for complete search history.

(56) References Cited

U.S. PATENT DOCUMENTS 2,877,967 A * 3/1959 Markusen ............ G05D 1/0202
244/185
4,031,527 A * 6/1977 Yanagishima ......... B60K 28/06
340/576
(Continued)

FOREIGN PATENT DOCUMENTS

JP     63168508 A  *  7/1988
JP     2002-279599 A    9/2002
(Continued)

OTHER PUBLICATIONS

Japanese Notification of Reasons for Refusal issued in corresponding Japanese Patent Application No. 2018-184748, dated Aug. 6, 2019, with English translation.

*Primary Examiner* — Shelley Chen
(74) *Attorney, Agent, or Firm* — McDermott Will & Emery LLP

(57) ABSTRACT

A vehicle driving assist apparatus includes a traveling environment recognizer, a target traveling path setting unit, a traveling controller, a lane changing path setting unit, a lane change controller, and a lane change urgency determining unit. The lane changing path setting unit is configured to set a lane changing path that allows an own vehicle to make a lane change when making of the lane change is determined, in an automatic driving mode, as being necessary. The lane change urgency determining unit is configured to change thresholds of a maximum steering speed to a second threshold greater than a first threshold when urgency of making the lane change is high. The lane changing path setting unit is configured to restrain or prohibit the making of the lane change when the maximum steering speed, upon the setting of the lane changing path, is equal to or greater than the second threshold.

3 Claims, 7 Drawing Sheets

(51) Int. Cl.
 *B60W 10/20* (2006.01)
 *B60W 10/04* (2006.01)
 *B60K 31/00* (2006.01)
 *B60W 40/114* (2012.01)
 *G05D 1/02* (2020.01)
 *B60W 30/12* (2020.01)

(52) U.S. Cl.
 CPC .......... *B60W 10/04* (2013.01); *B60W 10/20* (2013.01); *B60W 30/12* (2013.01); *B60W 40/114* (2013.01); *B60W 2420/42* (2013.01); *G05D 1/0246* (2013.01)

(56) References Cited

U.S. PATENT DOCUMENTS

| | | | | |
|---|---|---|---|---|
| 6,496,759 | B1* | 12/2002 | Mattes | B60R 21/013 180/282 |
| 6,577,948 | B1* | 6/2003 | Skellenger | G01C 21/26 303/140 |
| 7,996,131 | B2* | 8/2011 | Yamashita | G01B 21/22 280/735 |
| 9,555,801 | B2* | 1/2017 | Yester | B60W 10/18 |
| 2002/0042671 | A1* | 4/2002 | Chen | B60K 28/16 701/41 |
| 2003/0023359 | A1* | 1/2003 | Kueblbeck | B60R 21/013 701/45 |
| 2004/0098197 | A1* | 5/2004 | Matsumoto | B62D 1/286 701/301 |
| 2004/0183663 | A1* | 9/2004 | Shimakage | B62D 15/029 340/436 |
| 2005/0096828 | A1* | 5/2005 | Uemura | B60T 8/17557 701/70 |
| 2006/0155454 | A1* | 7/2006 | Herrmann | B60T 8/17555 701/70 |
| 2009/0088926 | A1* | 4/2009 | Yamashita | G01C 9/00 701/41 |
| 2009/0188744 | A1* | 7/2009 | Moeller | B62D 5/0466 180/446 |
| 2011/0238252 | A1* | 9/2011 | Takeda | B60W 40/076 701/31.4 |
| 2012/0109460 | A1* | 5/2012 | Tokimasa | B60W 50/045 701/41 |
| 2012/0212353 | A1* | 8/2012 | Fung | B60W 10/22 340/905 |
| 2013/0063595 | A1* | 3/2013 | Niem | B60W 30/12 348/148 |
| 2015/0246687 | A1* | 9/2015 | Takeda | B62D 6/008 701/41 |
| 2015/0251656 | A1* | 9/2015 | Yester | B60W 10/20 701/41 |
| 2015/0274206 | A1* | 10/2015 | Takeda | B62D 15/021 701/41 |
| 2016/0001781 | A1* | 1/2016 | Fung | G16H 50/20 701/36 |
| 2016/0001810 | A1* | 1/2016 | Tsubaki | B62D 6/08 701/42 |
| 2016/0114832 | A1* | 4/2016 | Taniguchi | B62D 15/025 701/41 |
| 2016/0280262 | A1* | 9/2016 | Oyama | G05D 1/02 |
| 2017/0043772 | A1* | 2/2017 | Watanabe | B60W 10/20 |
| 2017/0113546 | A1* | 4/2017 | Maeda | B60K 23/04 |
| 2017/0166254 | A1 | 6/2017 | Katoh | |
| 2017/0240172 | A1* | 8/2017 | Nishiguchi | B60W 30/18163 |
| 2018/0057054 | A1* | 3/2018 | Tokoro | B60R 11/04 |
| 2018/0072326 | A1* | 3/2018 | Ichikawa | G05D 1/0061 |
| 2018/0202804 | A1* | 7/2018 | Dumble | A01B 69/003 |

FOREIGN PATENT DOCUMENTS

| | | | |
|---|---|---|---|
| JP | 2005096710 A | * | 4/2005 |
| JP | 2012-116366 A | | 6/2012 |
| JP | 2014-061792 A | | 4/2014 |
| JP | 2017-105383 A | | 6/2017 |
| JP | 2017189989 A | * | 10/2017 |

* cited by examiner (A)

(B)

VEHICLE DRIVING ASSIST APPARATUS

CROSS-REFERENCE TO RELATED APPLICATIONS

The present application claims priority from Japanese Patent Application No. 2018-60104 filed on Mar. 27, 2018 and Japanese Patent Application No. 2018-184748 filed on Sep. 28, 2018, the entire contents of each of which are hereby incorporated by reference.

BACKGROUND

The technology relates to a vehicle driving assist apparatus that assists a driver in driving a vehicle.

Various proposals have been made on a technique related to an automatic driving control for a vehicle driving assist apparatus. Examples of the automatic driving control may include a lane keep assist control that keeps an own vehicle within a lane and a lane changing control that allows the own vehicle to make a lane change from a current lane to an adjacent lane.

As an example of a technique that allows for making of a lane change from a current traveling lane of the own vehicle to a target lane adjacent the current traveling lane in such an automatic driving control, Japanese Unexamined Patent Application Publication (JP-A) No. 2014-61792 discloses a technique that assists making of the lane change of the own vehicle to the target lane on the basis of a target path. The technique disclosed in JP-A No. 2014-61792 assists making of the lane change to the target lane through: calculating an end point of a target track; and setting, as the target path, a traveling path by which the own vehicle is able to reach, in a preset time, the end point from a start point of the lane change. The end point is a point at which making of the lane change of the own vehicle ends, and is calculated by taking factors including a speed of the own vehicle and a time required for making the lane change into consideration. The target path is, in other words, a target traveling path. JP-A No. 2014-61792 also discloses a technique that recalculates the end point to thereby recalculate the target traveling path on the basis of the recalculated end point. The end point is recalculated in accordance with factors including a change in traveling state of a vehicle present in the target lane.

SUMMARY

An aspect of the technology provides a vehicle driving assist apparatus that includes: a traveling environment recognizer configured to recognize a traveling environment of an own vehicle; a target traveling path setting unit configured to set, on a basis of the traveling environment recognized by the traveling environment recognizer, a target traveling path onto a traveling lane of the own vehicle; a traveling controller having an automatic driving mode, in which the automatic driving mode is configured to perform, on a basis of the target traveling path set by the target traveling path setting unit, a driving assist control that does not require a driver of the own vehicle to hold a steering wheel of the own vehicle; a lane changing path setting unit configured to set a lane changing path and calculate a maximum steering speed, when the lane changing path setting unit determines, upon traveling in the automatic driving mode and on a basis of a preset condition, that making of a lane change is necessary, in which the lane changing path allows the own vehicle to make the lane change from the traveling lane of the own vehicle to an adjacent lane, and the maximum steering speed is a maximum speed of steering that is to be performed upon a steering control that causes the own vehicle to travel along the lane changing path; a lane change controller configured to perform, on a basis of the lane changing path set by the lane changing path setting unit, a lane changing control that involves the steering control; and a lane change urgency determining unit configured to determine, on a basis of information acquired by the traveling environment recognizer, urgency of making the lane change. The lane change urgency determining unit is configured to change thresholds of the maximum steering speed to a second threshold that is greater than a first threshold when the urgency is determined by the lane change urgency determining unit as being high. The first threshold is a threshold of the maximum steering speed where the urgency is determined by the lane change urgency determining unit as not being high. The lane changing path setting unit is configured to restrain or prohibit execution of the making of the lane change when the maximum steering speed, upon the setting of the lane changing path by the lane changing path setting unit, is equal to or greater than the second threshold.

An aspect of the technology provides a vehicle driving assist apparatus that includes: a detector configured to recognize a traveling environment of an own vehicle; and circuitry configured to set, on a basis of the traveling environment recognized by the detector, a target traveling path onto a traveling lane of the own vehicle, control traveling of the own vehicle on a basis of an automatic driving mode, in which the automatic driving mode is configured to perform, on a basis of the target traveling path, a driving assist control that does not require a driver of the own vehicle to hold a steering wheel of the own vehicle, set a lane changing path when making of a lane change is determined, upon the traveling in the automatic driving mode and on a basis of a preset condition, as being necessary, in which the lane changing path allows the own vehicle to make the lane change from the traveling lane of the own vehicle to an adjacent lane, calculate a maximum steering speed when the making of the lane change is determined, upon the traveling in the automatic driving mode and on the basis of the preset condition, as being necessary, in which the maximum steering speed is a maximum speed of steering that is to be performed upon a steering control that causes the own vehicle to travel along the lane changing path, determine, on a basis of information acquired by the detector, urgency of making the lane change, change thresholds of the maximum steering speed to a second threshold that is greater than a first threshold when the urgency is determined as being high, in which the first threshold is a threshold of the maximum steering speed where the urgency is determined as not being high, restrain or prohibit execution of the making of the lane change when the maximum steering speed, upon the setting of the lane changing path, is equal to or greater than the second threshold, and perform, on a basis of the lane changing path, a lane changing control that involves the steering control when the maximum steering speed, upon the setting of the lane changing path, is less than the second threshold.

DETAILED DESCRIPTION

Figure 1:
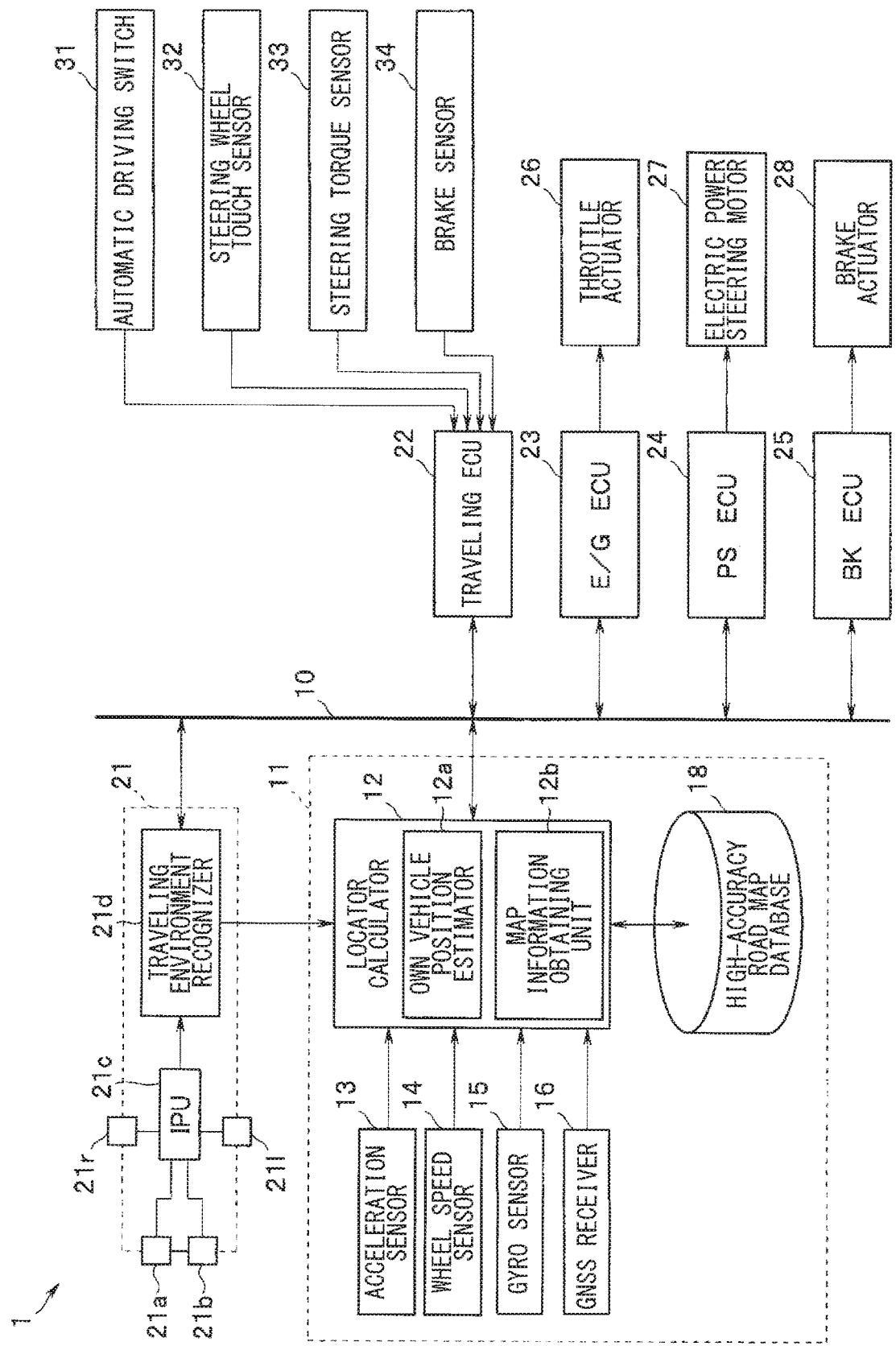
FIG. 1 schematically illustrates an example of a configuration of a driving assist apparatus according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

A limitation, such as an upper limit, is often placed on a steering speed based on an automatic steering, upon performing a lane change as a part of an automatic driving control in a driving assist apparatus, such as the driving assist apparatus described above. One reason is to make the lane change without giving a driver or any other occupant a sense of anxiety by suppressing, for example, a generation of an abrupt yaw moment. Such a driving assist apparatus often executes an automatic refuge mode, on a condition that making of the lane change on the basis of a steering speed is determined as being difficult and that further traveling based on automatic driving is determined as being difficult. The automatic refuge mode may automatically evacuate the own vehicle to a safe location such as a road shoulder.

However, if making of the lane change is abandoned and the automatic refuge mode is executed in a situation where the making of the lane change should be performed in spite of a possible deterioration to some extent in a ride quality to be felt by an occupant, the occupant may possibly experience a sense of discomfort even more. For example, the occupant may experience a sense of discomfort if the automatic refuge mode is executed in a situation where the making of the lane change becomes necessary to avoid an obstacle existing in a target traveling path.

It is desirable to provide a vehicle driving assist apparatus that makes it possible to perform an appropriate lane change without giving an occupant a sense of discomfort.

Figure 2:
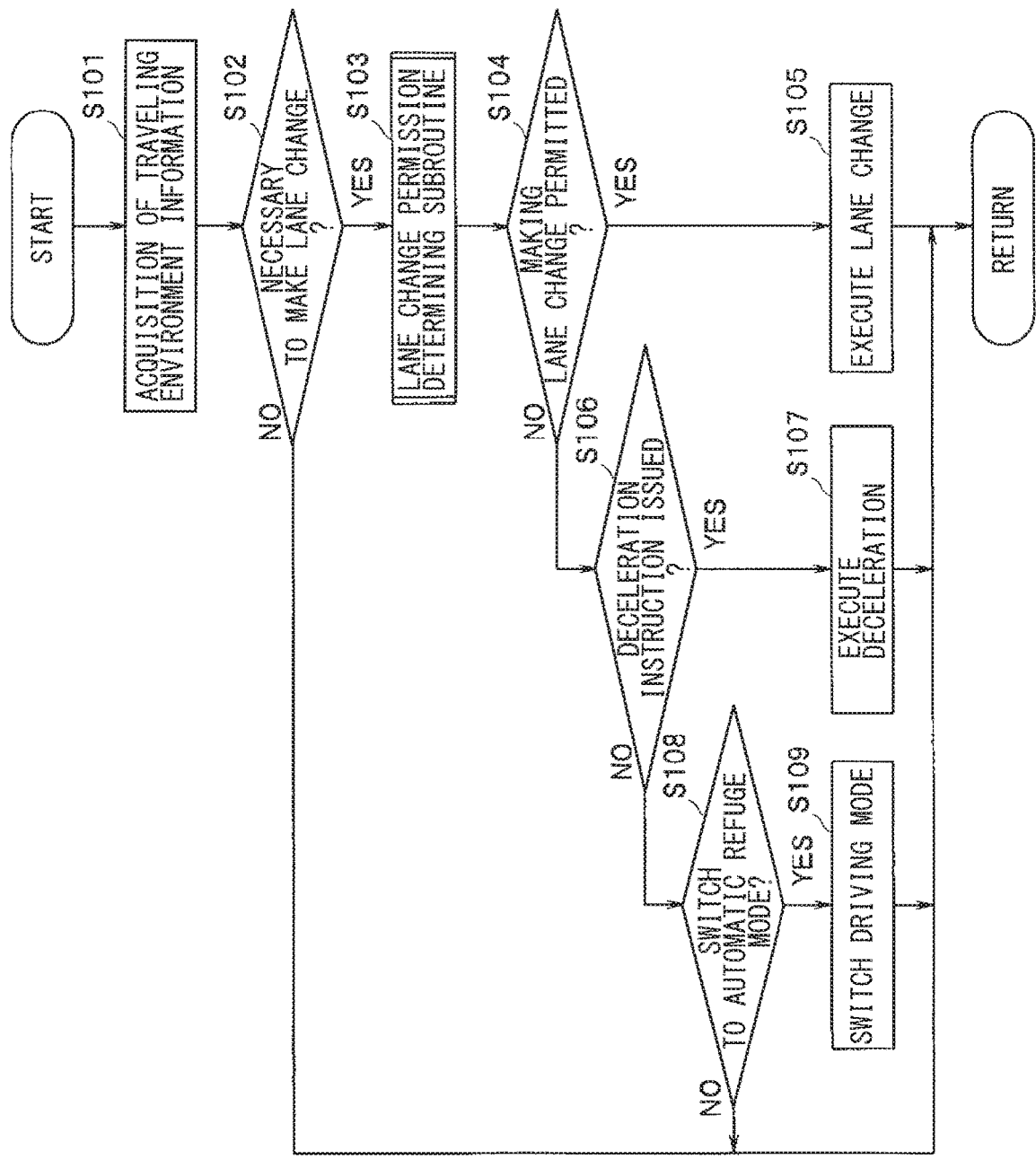
FIG. 2 is a flowchart illustrating an example of a routine related to determining execution of making of a lane change in an automatic driving mode.
Figure 3:
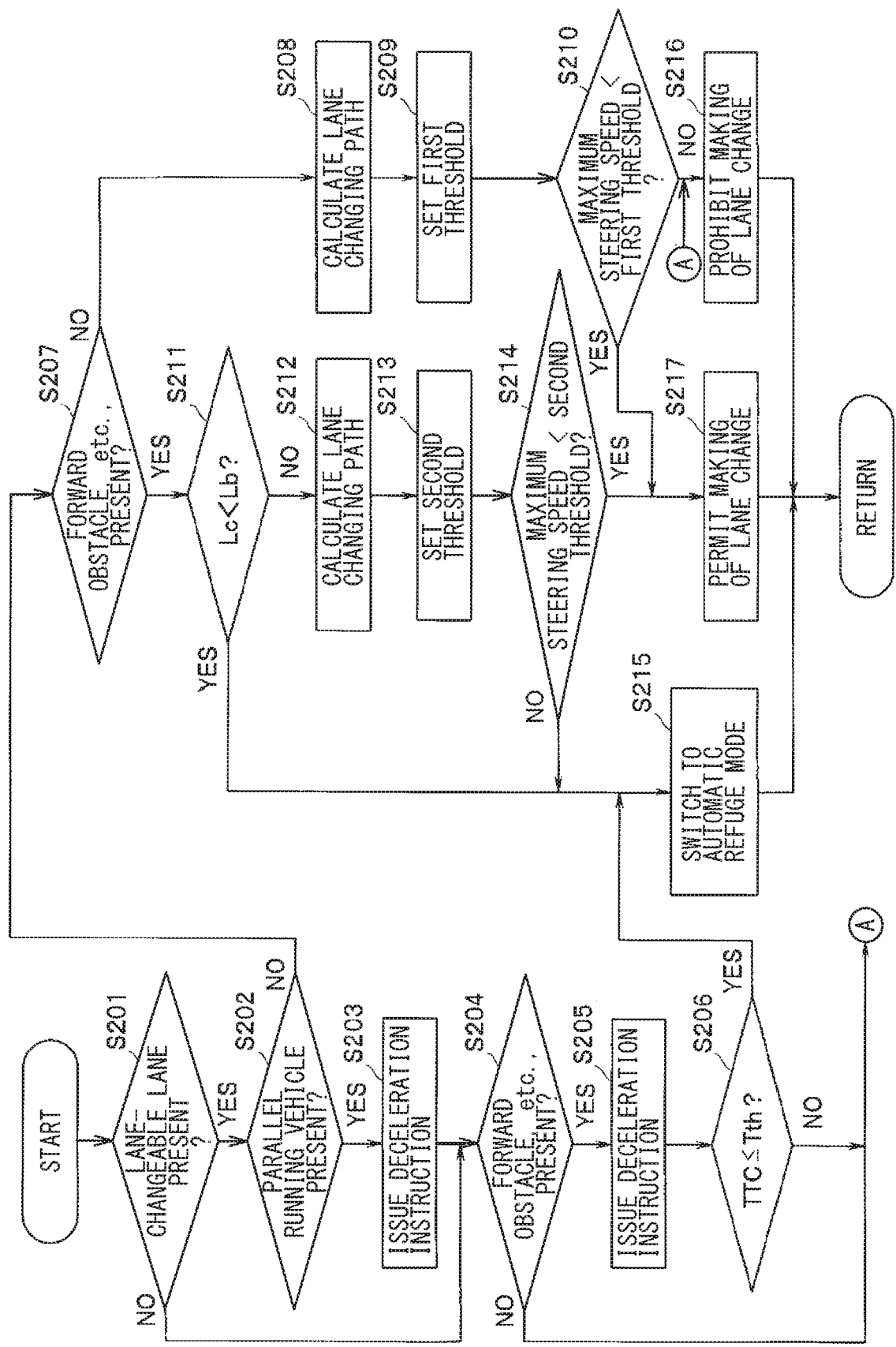
FIG. 3 is a flowchart illustrating an example of a subroutine related to determining permission for making of the lane change.
Figure 4:
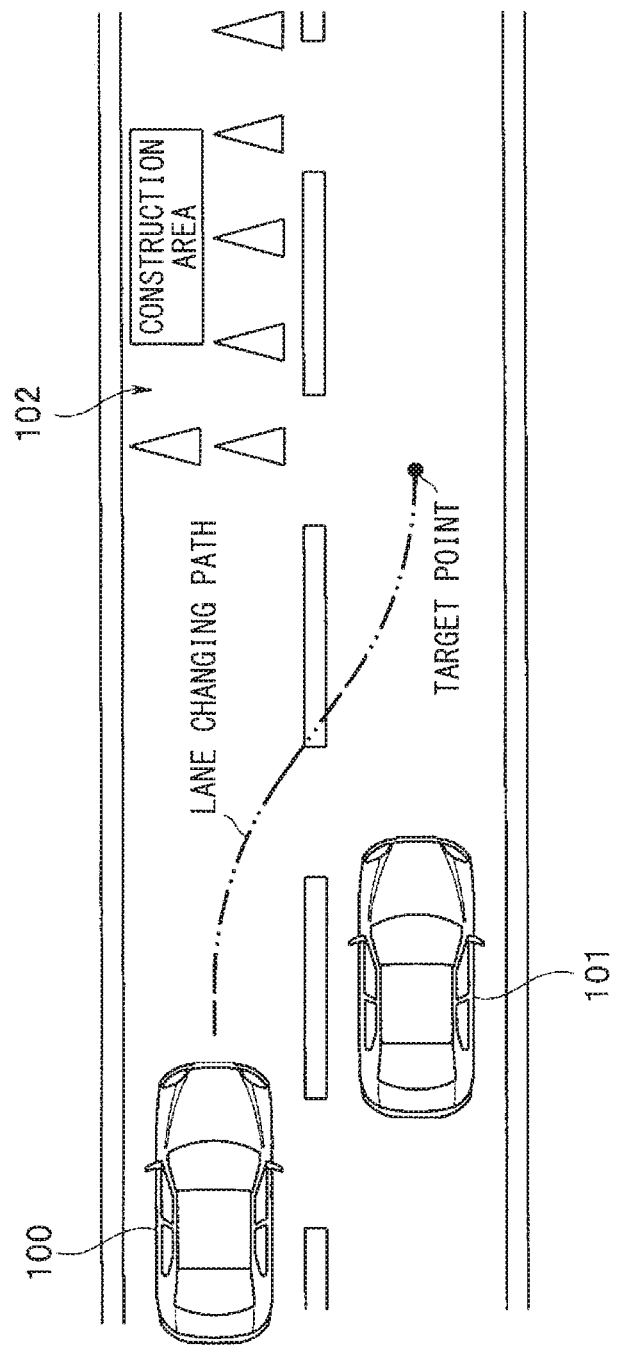
FIG. 4 is a diagram illustrating an example of a target traveling path set upon making the lane change.
Figure 5:
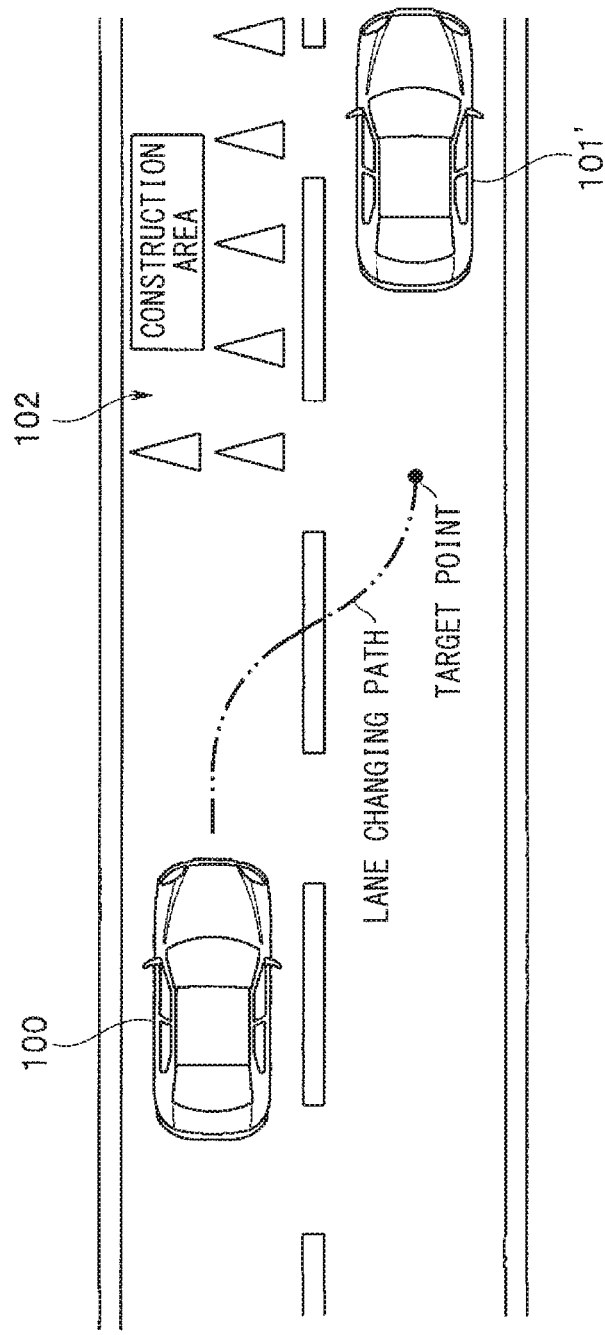
FIG. 5 is another diagram illustrating an example of a target traveling path set upon making the lane change.
Figure 6:
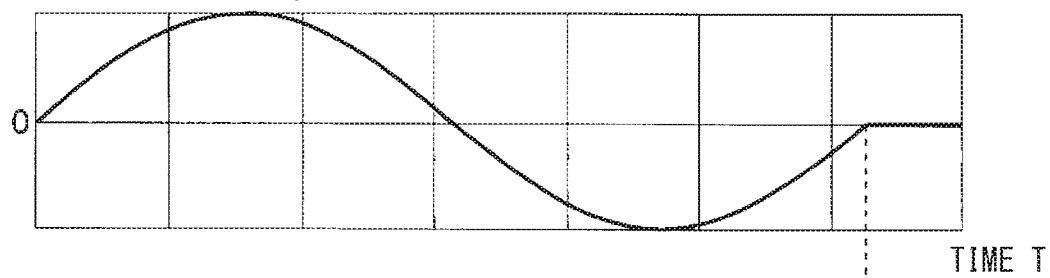
FIG. 6 is a diagram illustrating an example of a temporal change in a steering wheel angle, in which (A) illustrates the temporal change in the steering wheel angle upon making the lane change at a timing illustrated in FIG. 4, and (B) illustrates the temporal change in the steering wheel angle upon making the lane change at a timing illustrated in FIG. 5.
Figure 6:
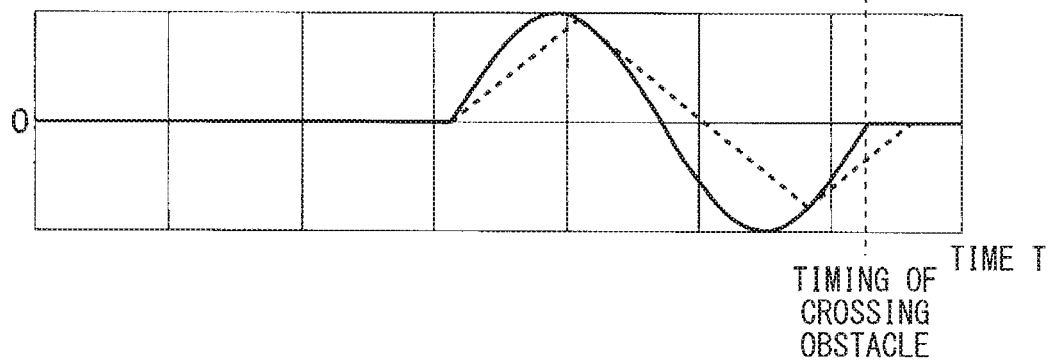
Figure 7:
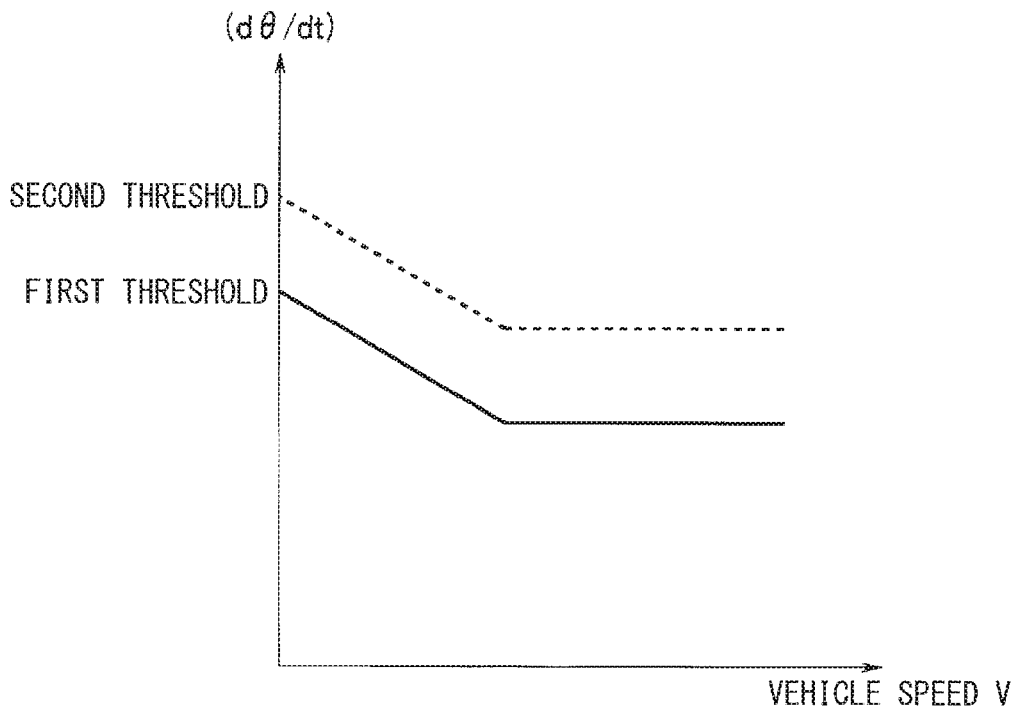
FIG. 7 is a map illustrating an example of thresholds of a steering speed.
Figure 8:
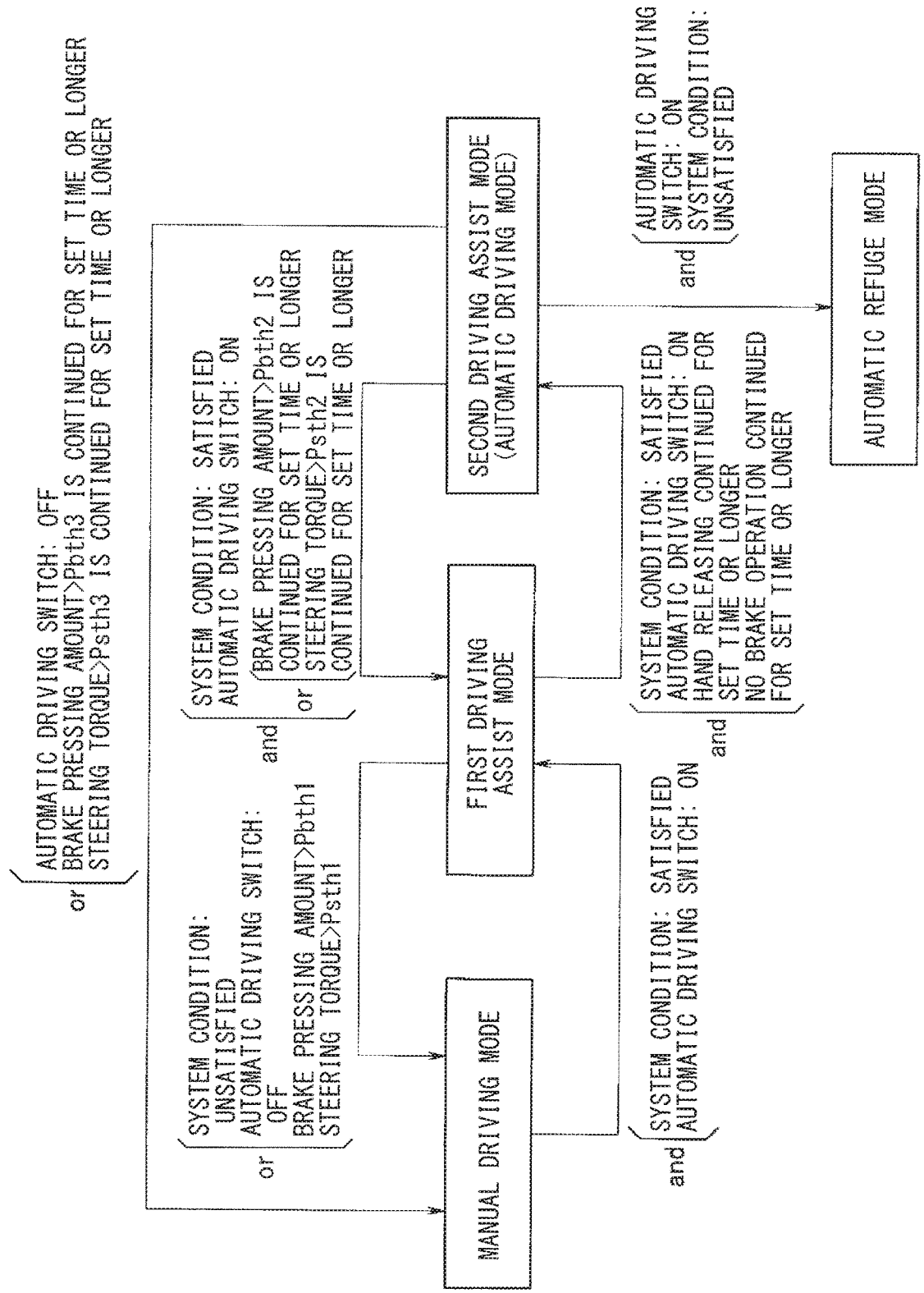
FIG. 8 is a diagram illustrating an example of making transitions between driving modes.

The drawings illustrate an example implementation of the technology, in which: FIG. 1 schematically illustrates an example of a configuration of a driving assist apparatus; FIG. 2 is a flowchart illustrating an example of a routine related to determining execution of making of a lane change in an automatic driving mode; FIG. 3 is a flowchart illustrating an example of a subroutine related to determining permission for making of the lane change; FIGS. 4 and 5 are each a diagram illustrating an example of a target traveling path set upon making the lane change; FIG. 6 is a diagram illustrating an example of a temporal change in a steering wheel angle upon making the lane change; FIG. 7 is a map illustrating an example of thresholds of a steering speed; and FIG. 8 is a diagram illustrating an example of making transitions between driving modes.

An example implementation of the technology is now described with reference to the drawings. Referring to FIG. 1, a driving assist apparatus 1 may be mounted on a vehicle or an "own vehicle", which can be an automobile or any other structure having wheels. The driving assist apparatus 1 may include a sensor unit that recognizes a traveling environment outside the vehicle. The sensor unit may include a locator unit 11 and a camera unit 21. In one implementation, the sensor unit may serve as a "traveling environment recognizer." In one implementation, the sensor unit may serve as a "detector." The locator unit 11 and the camera unit 21 may constitute a completely independent multiplex system in which the locator unit 11 and the camera unit 21 do not depend on each other. The driving assist apparatus 1 may also include a traveling control unit (hereinafter referred to as a "traveling ECU") 22, an engine control unit (hereinafter referred to as an "E/G ECU") 23, a power steering control unit (hereinafter referred to as a "PS ECU") 24, and a brake control unit (hereinafter referred to as a "BK ECU") 25. The traveling ECU 22, the E/G ECU 23, the PS ECU 24, and the BK ECU 25 may be coupled to each other together with the locator unit 11 and the camera unit 21 through an in-vehicle communication line 10. For example, the in-vehicle communication line 10 can be a controller area network (CAN), or any other communication network usable in a vehicle.

The locator unit 11 may estimate a position of the own vehicle (i.e., an own vehicle position) on a road map. The locator unit 11 may include a locator calculator 12 that estimates the own vehicle position.

The locator calculator 12 may be coupled, at its input side, to various sensors used to estimate the own vehicle position. Non-limiting examples of the sensors may include: an acceleration sensor 13 that detects forward-rear acceleration of the own vehicle; a wheel speed sensor 14 that detects a speed of rotation, i.e., a wheel speed, of a corresponding wheel among a front-right wheel, a front-left wheel, a rear-right wheel, and a rear left wheel; a gyro sensor 15 that detects an angular velocity or angular acceleration of the own vehicle; and a global navigation satellite system (GNSS) receiver 16 that receives positioning signals transmitted from a plurality of positioning satellites.

The locator calculator 12 may be coupled to a high-accuracy road map database 18. In one implementation, the high-accuracy road map database 18 may serve as a "storage". The high-accuracy road map database 18 may be a large-capacity storage medium such as a hard disk drive (HDD), and hold highly-accurate road map information (e.g., a dynamic map). The high-accuracy road map information may contain lane data used for performing automatic driving. Non-limiting examples of the lane data may include data on a width of a lane, data on coordinates of a middle position in the lane, data on azimuth in a traveling direction of the lane, and data on a speed limit. The lane data may be set for each lane on the road map at an interval of several meters.

The locator calculator 12 may include an own vehicle position estimator 12a and a map information obtaining unit 12b. The own vehicle position estimator 12a may estimate the own vehicle position.

The map information obtaining unit 12b may obtain, from the road map information stored in the high-accuracy road map database 18, route map information related to a route from a current location to a destination. The map information obtaining unit 12b may obtain the route map information on the basis of the destination set by a driver for the automatic driving. The map information obtaining unit 12b may transmit the thus-obtained route map information (i.e., the lane data on the route map) to the own vehicle position estimator 12a. The own vehicle position estimator 12a may obtain coordinates of the position of the own vehicle on the basis of the positioning signals received by the GNSS receiver 16. The own vehicle position estimator 12a may perform map matching of the obtained position coordinates onto the route map information to thereby estimate the own vehicle position on the road map and to thereby identify a lane in which the own vehicle is traveling. The own vehicle position estimator 12a may also obtain a road curvature of the middle of the traveling lane stored in information on road map.

The own vehicle position estimator 12a may switch to an autonomous navigation in an environment where reception of valid positioning signals from the positioning satellites is difficult due to, for example, a reduced sensitivity of the GNSS receiver 16. Non-limiting examples of such an environment may include traveling inside a tunnel. In the autonomous navigation, the own vehicle position estimator 12a may estimate the own vehicle position on the basis of one or more of: a vehicle speed determined on the basis of the wheel speeds detected by the wheel speed sensor 14; the angular velocity detected by the gyro sensor 15; and the forward-rearward acceleration detected by the forward-rearward acceleration sensor 13. By switching to the autonomous navigation, the own vehicle position estimator 12a may estimate the own vehicle position that is on the road map.

The camera unit 21 may include a vehicle-mounted camera, an image processing unit (IPU) 21c, and a traveling environment recognizer 21d. The vehicle-mounted camera may be provided inside a vehicle interior of the own vehicle and fixed at an upper-middle part of the front of the vehicle interior. For example, the vehicle-mounted camera can be a stereo camera, and may include a main camera 21a and a sub camera 21b. The main camera 21a and the sub camera 21b may be disposed at their respective positions that are symmetrical across the middle of the own vehicle in a width direction.

The IPU 21c may perform a predetermined image process on information of images of a traveling environment ahead of the own vehicle which are captured by the main camera 21a and the sub camera 21b. On the basis of the information of images having been subjected to the predetermined image process, the IPU 21c may generate forward traveling environment image information that contains a distance information. The distance information may be determined on the basis of an amount of shift in position of a corresponding target in the images. In other words, the IPU 21c may generate distance image information.

On the basis of any information, including the distance image information received from the IPU 21c, the traveling environment recognizer 21d may determine a road curvature [1/m] of lane lines that define right and left of a traveling road on which the own vehicle travels (i.e., an own vehicle traveling road), and may determine a width (i.e., a lane width) between the right and left lane lines. Any of various known methods of determining a road curvature and a lane width may be used to determine the road curvature [1/m] of the right and left lane lines and the lane width therebetween. For example, the traveling environment recognizer 21d may determine the road curvature through: recognizing right and left lane lines on the basis of the forward traveling environment image information and determining, for each predetermined section, the curvature of each of the right and left lane lines. The right and left lane lines may be recognized through a binarization process that utilizes a difference in luminance. The curvature of each of the right and left lane lines may be determined through, for example, a curve-approximating expression that is based on a least-square method. The traveling environment recognizer 21d may calculate the lane width from a difference between the thus-determined curvatures of the respective right and left lane lines.

On the basis of the curvature of the respective right and left lane lines and the lane width, the traveling environment recognizer 21d may determine a road curvature of the middle of the lane, which is referred to as a "camera curvature" in the present example implementation. Further, the traveling environment recognizer 21d may calculate a deviation in lateral position of the own vehicle based on the middle of the lane as a reference. More specifically, the traveling environment recognizer 21d may calculate an own vehicle lateral position deviation Xdiff that is a distance from the middle of the lane to the middle in the width direction of the own vehicle.

The traveling environment recognizer 21d may perform a process, such as a predetermined pattern matching, on the distance image information and thereby perform a recognition. The traveling environment recognizer 21d may perform the recognition of a guardrail, a curb, and/or any other wall present along the road. The traveling environment recognizer 21d may also recognize a three-dimensional object on the road. Upon recognizing the three-dimensional object, the traveling environment recognizer 21d may recognize a type of the three-dimensional object, a distance from the own vehicle to the three-dimensional object, a speed of the three-dimensional object, a relative speed between the own vehicle and the three-dimensional object, and any other factor related to the three-dimensional object.

The camera unit 21 may also include side-rear cameras 21l and 21r that capture images of respective left-rear and right-rear regions of the own vehicle. The IPU 21c may receive information on images of a traveling environment of the sides of the own vehicle which are captured by the side-rear cameras 21l and 21r, and may perform a predetermined image process on the received side traveling environment image information. For example, the predetermined image process can be an edge detection and/or any other image process. Further, the traveling environment recognizer 21d may perform a predetermined process on edge information obtained as a result of the detection performed by the IPU 21c, and may thereby perform a recognition of a three-dimensional object. For example, the predetermined process to be performed by the traveling environment recognizer 21d can be a pattern matching. Non-limiting examples of the three-dimensional object to be recognized by the traveling environment recognizer 21d may include a parallel running vehicle present on a side of the own vehicle and a following vehicle present at the rear of the own vehicle.

The traveling ECU 22 may obtain pieces of information including: information on the own vehicle position estimated by the own vehicle position estimator 12a of the locator calculator 12; information on the own vehicle lateral position deviation Xdiff determined by the traveling environment recognizer 21d of the camera unit 21; and information on the three-dimensional object determined by the traveling environment recognizer 21d. The traveling ECU 22 may be coupled, at its input side, to various sensors and devices. Non-limiting examples of such sensors and devices may include an automatic driving switch 31, a steering wheel touch sensor 32, a steering torque sensor 33, and a brake sensor 34. The automatic driving switch 31 may allow the driver to turn on or off the automatic driving, or a driving assist control. The steering wheel touch sensor 32 may be turned on when the driver holds or grabs a steering wheel. The steering torque sensor 33 may detect steering torque as an amount of driving operation performed by the driver. The brake sensor 34 may detect a brake pressing amount as an amount of driving operation performed by the driver.

The traveling ECU 22 may have driving modes. In an example implementation, the driving modes set in the traveling ECU 22 may include a manual driving mode, a first driving assist mode, a second driving assist mode, and an automatic refuge mode.

The manual driving mode may be one of holding-required driving modes that require the driver to hold the steering wheel. The manual driving mode may allow the own vehicle to travel in accordance with the driving operation performed by the driver, including a steering operation, an accelerator operation, and a brake operation.

The first driving assist mode may also be one of the holding-required driving modes that require the driver to hold the steering wheel. While reflecting the driving operation performed by the driver, the first driving assist mode may mainly perform an adaptive cruise control and any other control in combination through controlling control units including the E/G ECU 23, the PS ECU 24, and the BK ECU 25. Non-limiting examples of any other control may include a lane keep assist control and a lane departure prevention control. The first driving assist mode may be a semi-automatic driving mode that allows the own vehicle to travel along a target traveling path.

The second driving assist mode may mainly perform the adaptive cruise control and any other control, such as the lane keep assist control or the lane departure prevention control, in combination through controlling the control units including the E/G ECU 23, the PS ECU 24, and the BK ECU 25, without requiring the driver to hold the steering wheel. The second driving assist mode may be an automatic driving mode that allows the own vehicle to travel along the target traveling path.

The automatic refuge mode may automatically stop the own vehicle to a safe location such as a side strip. For example, the refuge mode may automatically stop the own vehicle to the safe location on a condition that: the traveling on the basis of the second driving assist mode becomes unable to continue during the traveling in the second driving assist mode; and the driver fails to take over the driving operation, e.g., when there is a failure in making a transition from the second driving assist mode to the manual driving mode or to the first driving assist mode.

The traveling ECU 22 may be able to selectively switch between the driving modes configured as described above.

For switching the driving mode, the traveling ECU 22 may compare a lateral position estimated by the own vehicle position estimator 12a and the own vehicle lateral position calculated by the traveling environment recognizer 21d. For example, the traveling ECU 22 may perform the comparison on a constant basis. The lateral position estimated by the own vehicle position estimator 12a may be a position of the own vehicle relative to the middle of the lane on the road map. In a case where an absolute value of a difference between the lateral position estimated by the own vehicle position estimator 12a and the own vehicle lateral position calculated by the traveling environment recognizer 21d exceeds a preset threshold, the traveling ECU 22 may determine that one of the own vehicle position (e.g., the lateral position) estimated by the own vehicle position estimator 12a and the own vehicle lateral position calculated by the traveling environment recognizer 21d involves a decrease in reliability, and may thereby determine that a system condition for executing the automatic driving is unsatisfied. On the basis of a result of the determination as to whether or not the system condition is satisfied and pieces of input information received from the various switches and sensors, the traveling ECU 22 may switch the driving mode to any of the driving modes to be executed.

For example, referring to FIG. 8, in a case where the current driving mode is the manual driving mode, the traveling ECU 22 may determine that a transition is to be made from the manual driving mode to the first driving assist mode on a condition that: the system condition is satisfied; and the automatic driving switch 31 is turned on by the driver.

In a case where the current driving mode is the first driving assist mode, the traveling ECU 22 may determine that a transition is to be made from the first driving assist mode to the second driving assist mode on the premise that the system condition has been satisfied and the automatic driving switch 31 has been kept ON, and on a condition that: the driver has kept releasing his/her hand from the steering wheel for a set period of time or longer; and the brake operation to be performed by the driver has not been performed continuously for a set period of time or longer.

In a case where the current driving mode is the first driving assist mode, the traveling ECU 22 may determine that a transition is to be made from the first driving assist mode to the manual driving mode on a condition that: the system condition becomes unsatisfied; the automatic driving switch 31 is turned off by the driver; the brake operation based on the brake pressing amount that is greater than a set threshold Pbth1 is performed by the driver; or the steering based on the steering torque that is greater than a set threshold Psth1 is performed by the driver.

In a case where the current driving mode is the second driving assist mode, the traveling ECU 22 may determine that a transition is to be made from the second driving assist mode to the first driving assist mode on the premise that the system condition has been satisfied and the automatic driving switch 31 has been kept ON, and on a condition that: the brake operation based on the brake pressing amount that is greater than a set threshold Pbth2 is kept performed by the driver for a set period of time or longer, where the set threshold Pbth2 is greater than the set threshold Psth1 (Pbth2>Pbth1); or the steering based on the steering torque that is greater than a set threshold Psth2 is kept performed by the driver for a set period of time or longer, where the set threshold Psth2 is greater than the set threshold Psth1 (Psth2>Psth1).

In a case where the current driving mode is the second driving assist mode, the traveling ECU 22 may determine that a transition is to be made from the second driving assist mode to the manual driving mode on a condition that: the automatic driving switch 31 is turned off by the driver; the brake operation based on the brake pressing amount that is greater than a set threshold Pbth3 is kept performed by the driver for a set period of time or longer, where the set threshold Pbth3 is greater than the set threshold Pbth2 (Pbth3>Pbth2); or the steering based on the steering torque that is greater than a set threshold Psth3 is kept performed by the driver for a set period of time or longer, where the set threshold Psth3 is greater than the set threshold Psth2 (Psth3>Psth2).

In a case where the current driving mode is the second driving assist mode, the traveling ECU 22 may determine that a transition is to be made from the second driving assist mode to the automatic refuge mode, on the premise that the automatic driving switch 31 has been kept ON and on a condition that the system condition becomes unsatisfied.

To achieve the first driving assist mode and the second driving assist mode, the traveling ECU 22 may set the target traveling path in a case where a preceding vehicle is recognized ahead of a traveling road of the own vehicle. For example, the recognition of the preceding vehicle may be performed by the traveling environment recognizer 21d. For example, the target traveling path may be set on the basis of a traveling trajectory of the preceding vehicle. In a case where the preceding vehicle is not recognized, the traveling ECU 22 may set the target traveling path on the basis of, for example, the traveling road of the own vehicle.

Upon setting the target traveling path, the traveling ECU 22 may set a lane changing path as a transitional target traveling path. The lane changing path may be a path directed to making a lane change. For example, the traveling ECU 22 may set the lane changing path in a case where it is necessary to make the lane change from the own vehicle traveling lane to an adjacent lane. Non-limiting example of such a case may include: avoiding a traffic jam; avoiding a construction area present ahead of the own vehicle traveling road; avoiding an obstacle present ahead of the own vehicle traveling road, such as a fallen object; and avoiding any other situation where making of the lane change is desirable.

Upon setting the lane changing path, the traveling ECU 22 may set a target point at any point on the adjacent lane as illustrated by way of example in FIG. 4. For example, any point on the adjacent lane may be based on the vehicle speed, and may be positioned ahead of the own vehicle by a predetermined distance. Further, for example, the traveling ECU 22 may calculate, for each predetermined time interval, a factor that allows an own vehicle 100 to reach the target point over a set time, and set the lane changing path on the basis of the calculated factor segmented for each predetermined time interval. Non-limiting examples of the factor to be calculated may include a target movement amount in a vehicle width direction of the own vehicle 100, a target acceleration of the own vehicle 100, and any other factor that allows the own vehicle 100 to reach the target point over the set time.

Upon setting the lane changing path, in an example case where the own vehicle 100 approaches an obstacle 102 as illustrated by way of example in FIG. 5, the traveling ECU 22 may correct the lane changing path on an as-needed basis, in order to avoid a situation such as a contact of the own vehicle 100 with the obstacle 102. For example, the traveling ECU 22 may correct the lane changing path on the basis of a relative distance between the own vehicle 100 and the obstacle 102, or any other factor related to the obstacle 102. In an example implementation illustrated in FIG. 5, the traveling ECU 22 may so correct the target point as to cause the target point to be positioned more toward the own vehicle 100 than the target point illustrated in FIG. 4, and set the lane changing path that allows the own vehicle 100 to reach the corrected target point over the set time. Note that the obstacle, or any other obstructing factor, may encompass a preceding vehicle that travels at a relatively low speed, in an example implementation.

Further, the traveling ECU 22 may confirm whether there is no obstructing factor in the adjacent lane as a destination of making of the lane change. For example, the obstructing factor can be the parallel running vehicle. In a case where the absence of the obstructing factor, such as the parallel running vehicle, in the adjacent lane is confirmed, the traveling ECU 22 may execute a lane changing control that involves an operation control that is based on the lane changing path.

It is to be noted that, upon executing the lane changing control, the traveling ECU 22 restrains or prohibits the execution of the lane changing control in a case where a maximum steering speed is equal to or greater than a preset threshold. The maximum steering speed is a maximum speed of the steering that is to be performed upon the steering control that causes the own vehicle to travel along the lane changing path.

Further, in a case where the making of the lane change involves a preset urgency, the traveling ECU 22 changes the thresholds to a second threshold that is greater than a reference first threshold as illustrated by way of example in FIG. 7.

For example, the first threshold may be an upper limit of the steering speed that prevents a generation of an abrupt yaw moment, or any other abrupt factor, and thus allows for the making of the lane change without giving the driver or an occupant a sense of anxiety. The first threshold may be so set as to be smaller as a vehicle speed V of the own vehicle becomes higher. For example, the second threshold may be an upper limit of the steering speed that is permissible upon performing the emergency evacuation steering. The second threshold is relatively greater than the first threshold, and may be so set as to be smaller as the vehicle speed V of the own vehicle becomes higher. The first threshold and the second threshold may be set on the basis of any experiment, simulation, etc.

Hence, in an example implementation, the traveling ECU 22 may place a limitation on the steering speed upon the setting of the path by the lane changing control, such that the maximum steering speed of the steering to be performed upon the steering control falls below the threshold. Further, the traveling ECU 22 changes the thresholds of the maximum steering speed to the second threshold that is greater than the first threshold, in a case where the traveling ECU 22 determines that the urgency of making the lane change is high. The first threshold may be the threshold of the maximum steering speed where the traveling ECU 22 determines that the urgency is not high. For example, the traveling ECU 22 may determine that the urgency is high due to the traffic jam, the construction area, and/or the presence of the obstacle, such as the fallen object, which are present ahead of the own vehicle traveling road. Moreover, in a case where the maximum steering speed is equal to or greater than the second threshold upon setting of the path by the lane changing control, the traveling ECU 22 may restrain or prohibit the execution of the making of the lane change.

In one implementation, the traveling ECU 22 may serve as a "target traveling path setting unit", a "traveling controller", a "lane changing path setting unit", a "lane change controller", and a "lane change urgency determining unit".

The E/G ECU 23 may be coupled, at its output side, to a throttle actuator 26. The throttle actuator 26 may open and close a throttle valve of an electronically-controlled throttle provided in a throttle body of an engine. The throttle actuator 26 may adjust an intake airflow through opening or closing the throttle valve in accordance with a drive signal transmitted from the E/G ECU 23, and may thereby generate a desired engine output.

The PS ECU 24 may be coupled, at its output side, to an electric power steering motor 27. The electric power steering motor 27 may apply the steering torque to a steering mechanism by means of torque of the electric power steering motor 27. Upon the automatic driving, the electric power steering motor 27 may be controlled and operated in accordance with a drive signal transmitted from the PS ECU 24, to thereby execute a control such as the lane keep assist control that keeps traveling of the own vehicle within a current traveling lane or the lane changing control that moves the own vehicle from the current traveling lane to an adjacent lane, e.g., the lane changing control for an overtaking control.

The BK ECU 25 may be coupled, at its output side, to a brake actuator 28. The brake actuator 28 may adjust a brake fluid pressure to be fed to brake wheel cylinders provided for the respective wheels, and may be driven in accordance with a drive signal transmitted from the BK ECU 25. The thus-driven brake actuator 28 may allow the brake wheel cylinders to generate brake force to be applied to the wheels and may thereby cause the own vehicle to decelerate forcibly.

A description is given next of a lane change execution determining control to be executed by the traveling ECU 22, with reference to a flowchart of an example of a routine related to determining the execution of making of the lane change illustrated in FIG. 2. The lane change execution determining routine illustrated by way of example in FIG. 2 may be repeatedly executed, for every set time, during the execution of the automatic driving mode such as the second driving assist mode. Upon start of the routine, at step S101, the traveling ECU 22 may first acquire, from devices including the locator unit 11 and the camera unit 21, any information related to the traveling environment of the own vehicle.

Thereafter, at step S102, the traveling ECU 22 may determine whether there is a necessity of making the lane change from the current traveling lane of the own vehicle to the adjacent lane. In an example implementation, the traveling ECU 22 may determine that the making of the lane change is necessary in an example case where: it is necessary to make the lane change in order to cause the own vehicle to travel from the current location to the destination on the basis of the route map information; or it is necessary to avoid the contact of the own vehicle with the obstacle, or any other obstructing factor, present ahead of the own vehicle traveling road.

In a case where the traveling ECU 22 determines at step S102 that it is not necessary to make the lane change (step S102: NO), the traveling ECU 22 may cause the flow to exit the routine while maintaining a traveling control of the own vehicle on the basis of the currently-set target traveling path.

In a case where the traveling ECU 22 determines at step S102 that it is necessary to make the lane change (step S102: YES), the traveling ECU 22 may cause the flow to proceed to step S103. At step S103, the traveling ECU 22 may determine whether to permit making of the lane change from the current traveling lane of the own vehicle.

The determination on the permission of making of the lane change may be executed in accordance with a flowchart of an example of a subroutine related to determining the permission of making of the lane change illustrated by way of example in FIG. 3. Upon start of the lane change permission determining subroutine, at step S201, the traveling ECU 22 may check whether an adjacent lane to which making of the lane change is possible is present next to the traveling lane of the own vehicle. The traveling ECU 22 may check the presence of such an adjacent lane on the basis of any information related to the traveling environment of the own vehicle acquired from devices including the locator unit 11 and the camera unit 21.

The traveling ECU 22 may cause the flow to proceed to step S202 in a case where the traveling ECU 22 determines at step S201 that the adjacent lane to which making of the lane change is possible is present (step S201: YES). The traveling ECU 22 may cause the flow to proceed to step S204 in a case where the traveling ECU 22 determines at step S201 that the adjacent lane to which making of the lane change is possible is absent (step S201: NO).

Upon proceeding to step S202 from step S201, the traveling ECU 22 may check, at step S202, whether the parallel running vehicle that runs side by side relative to the own vehicle is present on the adjacent lane to which making of the lane change is possible.

The traveling ECU 22 may cause the flow to proceed to step S207 in a case where the traveling ECU 22 determines at step S202 that the parallel running vehicle is absent (step S202: NO).

Referring by way of example to FIG. 4, in a case where the traveling ECU 22 determines at step S202 that a parallel running vehicle 101 that runs side by side relative to the own vehicle 100 is present (step S202: YES), the traveling ECU 22 may cause the flow to proceed to step S203. At step S203, the traveling ECU 22 may instruct the own vehicle 100 to decelerate in order to allow the parallel running vehicle 101 to move and positioned more forward than the own vehicle 100 relatively. After issuing the deceleration instruction at step S203, the traveling ECU 22 may cause the flow to proceed to step S204.

Upon proceeding to step S204 from step S201 or from step S203, the traveling ECU 22 may check, at step S204, whether an obstacle is present within a set distance ahead of the own vehicle in the target traveling path of the own vehicle.

The traveling ECU 22 may cause the flow to proceed to step S216 in a case where the traveling ECU 22 determines at step S204 that the obstacle is absent in the target traveling path within the set distance ahead of the own vehicle (step S204: NO).

In a case where the traveling ECU 22 determines at step S204 that the obstacle 102 is present in the target traveling path within the set distance ahead of the own vehicle 100 as illustrated by way of example in FIG. 4 (step S204: YES), the traveling ECU 22 may cause the flow to proceed to step S205. At step S205, the traveling ECU 22 may instruct, as necessary, the own vehicle 100 to decelerate with respect to the obstacle 102. After issuing the deceleration instruction at step S205, the traveling ECU 22 may cause the flow to proceed to step S206.

Upon proceeding to step S206 from step S205, the traveling ECU 22 may check, at step S206, whether a Time-To-Collision (TTC) is equal to or less than a preset threshold Tth. For example, the TTC may be calculated through dividing a relative distance between the own vehicle 100 and the forward obstacle 102 by a relative speed of the own vehicle 100 relative to the forward obstacle 102.

In a case where the traveling ECU 22 determines at step S206 that the TTC is greater than the threshold Tth (step S206: NO), the traveling ECU 22 may cause the flow to proceed to step S216.

In a case where the traveling ECU 22 determines at step S206 that the TTC is equal to or less than the threshold Tth (step S206: YES), the traveling ECU 22 may cause the flow to proceed to step S215 in consideration of a high possibility of the contact of the own vehicle 100 with the obstacle 102 if the own vehicle 100 continues to travel as it is.

Upon proceeding to step S207 from step S202, the traveling ECU 22 may check, at step S207, whether an obstacle is present within a set distance ahead of the own vehicle in the current target traveling path, i.e., on the own vehicle traveling lane. The traveling ECU 22 may determine that the urgency of avoiding the forward obstacle or any other obstacle present ahead of the own vehicle is high in a case where the forward obstacle or any other obstacle is present. The traveling ECU 22 may determine that the urgency of avoiding the forward obstacle or any other obstacle is not high in a case where the forward obstacle or any other obstacle is absent.

The traveling ECU 22 may cause the flow to proceed to step S208 in a case where the traveling ECU 22 determines at step S207 that the obstacle is absent in the target traveling path within the set distance ahead of the own vehicle (step S207: NO). In a case where the traveling ECU 22 determines at step S207 that the obstacle is present in the target traveling path within the set distance ahead of the own vehicle (step S207: YES), the traveling ECU 22 may cause the flow to proceed to step S211.

Upon proceeding to step S208 from step S207, the traveling ECU 22 may calculate, at step S208, the lane changing path. The lane changing path may be the transitional target traveling path that allows the own vehicle to make the lane change from the current traveling lane of the own vehicle to the adjacent lane. After calculating the lane changing path, the traveling ECU 22 may cause the flow to proceed to step S209.

Upon proceeding to step S209 from step S208, the traveling ECU 22 may set, at step S209, the first threshold for the threshold of the maximum steering speed. The maximum steering speed is a maximum speed of the steering that is to be performed upon making the lane change in accordance with the lane changing path. The first threshold is the threshold where the traveling ECU 22 determines that the urgency of making the lane change to avoid the obstacle or any other obstructing factor is not high. For example, the first threshold may be a reference value as illustrated by way of example in FIG. 7. The first threshold may be set on the basis of the steering speed that is within a range in which the yaw moment generated by the steering, or any other factor upon the steering, does not influence a ride quality to be felt by the driver and/or the occupant, and that is within a range that allows the own vehicle to make the lane change safely. After setting the first threshold, the traveling ECU 22 may cause the flow to proceed to step S210.

Upon proceeding to step S210 from step S209, the traveling ECU 22 may check, at step S210, whether the maximum steering speed of the steering that is to be performed in accordance with the lane changing path is less than the first threshold.

The traveling ECU 22 may cause the flow to proceed to step S217 in a case where the traveling ECU 22 determines at step S210 that the maximum steering speed is less than the first threshold (step S210: YES). In a case where the traveling ECU 22 determines at step S210 that the maximum steering speed is equal to or greater than the first threshold (step S210: NO), the traveling ECU 22 may cause the flow to proceed to step S216.

Upon proceeding to step S211 from step S207, the traveling ECU 22 may check, at step S211, whether a minimum distance Lc required for making the lane change is less than a distance Lb. The distance Lb may be a current distance from the own vehicle to the obstacle. For example, the minimum distance Lc may be so set as to be longer as the vehicle speed V of the own vehicle becomes higher, and may be set in advance on the basis of any experiment, simulation, etc.

The traveling ECU 22 may cause the flow to proceed to step S215 in a case where the traveling ECU 22 determines at step S211 that the minimum distance Lc is less than the distance Lb to the obstacle (step S211: YES). In a case where the traveling ECU 22 determines at step S211 that that the minimum distance Lc is equal to or greater than the distance Lb to the obstacle (step S211: NO), the traveling ECU 22 may cause the flow to proceed to step S212.

Upon proceeding to step S212 from step S211, the traveling ECU 22 may calculate, at step S212, the lane changing path serving as the transitional target traveling path that allows the own vehicle to make the lane change from the current traveling lane of the own vehicle to the adjacent lane. After calculating the lane changing path, the traveling ECU 22 may cause the flow to proceed to step S213.

Upon proceeding to step S213 from step S212, the traveling ECU 22 may set, at step S213, the second threshold for the threshold of the maximum steering speed of the steering that is to be performed upon making the lane change in accordance with the lane changing path. In other words, the traveling ECU 22 may set the second threshold that is the threshold of the maximum speed of the steering where the traveling ECU 22 determines that the urgency of making the lane change to avoid the obstacle or any other obstructing factor is high. For example, the second threshold is greater than the first threshold as illustrated by way of example in FIG. 7. The second threshold may be set on the basis of the steering speed that is within the range that allows the own vehicle to make the lane change safely in spite of a possible influence on the ride quality to be felt by the driver and/or the occupant due to the yaw moment or any other factor generated by the steering. After setting the second threshold, the traveling ECU 22 may cause the flow to proceed to step S214.

Upon proceeding to step S214 from step S213, the traveling ECU 22 may check, at step S214, whether the maximum steering speed of the steering that is to be performed in accordance with the lane changing path is less than the second threshold.

The traveling ECU 22 may cause the flow to proceed to step S217 in a case where the traveling ECU 22 determines at step S214 that the maximum steering speed is less than the second threshold (step S214: YES). In a case where the traveling ECU 22 determines at step S214 that the maximum steering speed is equal to or greater than the second threshold (step S214: NO), the traveling ECU 22 may cause the flow to proceed to step S215.

Upon proceeding to step S215 from step S206, from step S211, or from step S214, the traveling ECU 22 may determine, at step S215, to switch the driving mode from the currently-selected second driving assist mode to the automatic refuge mode. After making the determination to switch the driving mode to the automatic refuge mode, the traveling ECU 22 may cause the flow to exit the subroutine.

Upon proceeding to step S216 from step S204, from step S206, or from step S210, the traveling ECU 22 may determine, at step S216, to prohibit the making of the lane change from the current traveling lane of the own vehicle to the adjacent lane. After making the determination to prohibit the making of the lane change to the adjacent lane, the traveling ECU 22 may cause the flow to exit the subroutine.

Upon proceeding to step S217 from step S210 or from step S214, the traveling ECU 22 may determine, at step S217, to permit the making of the lane change from the current traveling lane of the own vehicle to the adjacent lane. After making the determination to permit the making of the lane change to the adjacent lane, the traveling ECU 22 may cause the flow to exit the subroutine.

Upon proceeding to step S104 from step S103 in the main routine illustrated by way of example in FIG. 2, the traveling ECU 22 may check, at step S104, whether the determination to permit the making of the lane change has been made in the lane change permission determining subroutine.

The traveling ECU 22 may cause the flow to proceed to step S105 in a case where the determination to permit the making of the lane change has been made as a result of the checking at step S104 (step S104: YES). Upon proceeding to step S105 from step S104, the traveling ECU 22 may execute, in accordance with the lane changing path set at step S208 or at step S212, the lane changing control that allows the own vehicle to make the lane change from the current traveling lane of the own vehicle to the adjacent lane. After executing the lane changing control, the traveling ECU 22 may cause the flow to exit the routine.

Thus, in a case where the maximum steering speed of the steering, to be performed upon the steering control that causes the own vehicle to travel along the calculated lane changing path, is less than the first threshold, the lane changing control may be executed that allows the own vehicle to make the lane change from the current traveling lane of the own vehicle to the adjacent lane. For example, the lane changing path calculated in this case may be based on a condition that: the adjacent lane to which the making of the lane change is possible is present; and the obstacle or any other obstructing factor is not present on the own vehicle traveling road within the set distance ahead of the own vehicle and the urgency of making the lane change is determined as not being high accordingly.

Further, in a case where the maximum steering speed of the steering, to be performed upon the steering control that causes the own vehicle to travel along the calculated lane changing path, is less than the second threshold that is greater than the first threshold, the lane changing control may be executed that allows the own vehicle to make the lane change from the current traveling lane of the own vehicle to the adjacent lane. For example, the lane changing path calculated in this case may be based on a condition that: the adjacent lane to which the making of the lane change is possible is present; and the urgency of making the lane change is determined as being high due to the presence of the obstacle or any other obstructing factor on the own vehicle traveling road within the set distance ahead of the own vehicle accordingly.

The traveling ECU 22 may cause the flow to proceed to step S106 in a case where the determination to permit the making of the lane change has not been made as a result of the checking at step S104 (step S104: NO). Upon proceeding to step S106 from step S104, the traveling ECU 22 may check, at step S106, whether the deceleration instruction of the own vehicle with respect to the parallel running vehicle or to the forward obstacle has been issued in the lane change permission determining subroutine.

In a case where the traveling ECU 22 determines at step S106 that the deceleration instruction has been issued (step S106: YES), the traveling ECU 22 may cause the flow to proceed to step S107. Upon proceeding to step S107 from step S106, the traveling ECU 22 may execute, at step S107, a control of decelerating the own vehicle with respect to the parallel running vehicle or to the forward obstacle. After executing the deceleration control, the traveling ECU 22 may cause the flow to exit the routine.

In a case where the traveling ECU 22 determines at step S106 that the deceleration instruction has not been issued (step S106: NO), the traveling ECU 22 may cause the flow to proceed to step S108. Upon proceeding to step S108 from step S106, the traveling ECU 22 may check, at step S108, whether the determination to switch the driving mode from the second driving assist mode to the automatic refuge mode has been made in the lane change permission determining subroutine.

The traveling ECU 22 may cause the flow to proceed to step S109 in a case where the determination to switch the driving mode to the automatic refuge mode has been made as a result of the checking at step S108 (step S108: YES). Upon proceeding to step S109 from step S108, the traveling ECU 22 may switch, at step S109, the driving mode from the currently-selected second driving assist mode to the automatic refuge mode. After switching the driving mode to the automatic refuge mode, the traveling ECU 22 may cause the flow to exit the routine.

Thus, in a case where the maximum steering speed of the steering, to be performed upon the steering control that causes the own vehicle to travel along the calculated lane changing path, is equal to or greater than the first threshold, the execution of the lane changing control that allows the own vehicle to make the lane change from the current traveling lane of the own vehicle to the adjacent lane may be restrained or prohibited. For example, the lane changing path calculated in this case may be based on a condition that: the adjacent lane to which the making of the lane change is possible is present; and the obstacle or any other obstructing factor is not present on the own vehicle traveling road within the set distance ahead of the own vehicle and the urgency of making the lane change is determined as not being high accordingly.

Further, in a case where the maximum steering speed of the steering, to be performed upon the steering control that causes the own vehicle to travel along the calculated lane changing path, is equal to or greater than the second threshold that is greater than the first threshold, the execution of the lane changing control that allows the own vehicle to make the lane change from the current traveling lane of the own vehicle to the adjacent lane is restrained or prohibited. For example, the lane changing path calculated in this case may be based on a condition that: the adjacent lane to which the making of the lane change is possible is present; and the urgency of making the lane change is determined as being high due to the presence of the obstacle or any other obstructing factor on the own vehicle traveling road within the set distance ahead of the own vehicle accordingly.

Note that the traveling ECU 22 may switch the driving mode to the first driving assist mode or to the manual driving mode to reflect the driver's intention, in a case where the steering torque that is derived from the driver and equal to or greater than a predetermined steering torque is detected, or in a case where the brake pressing amount that is derived from the driver and equal to or greater than a predetermined brake pressing amount is detected.

The traveling ECU 22 may cause the flow to exit the routine as it is in a case where the determination to switch the driving mode to the automatic refuge mode has not been made as a result of the checking at step S108 (step S108: NO).

According to the foregoing example implementation, the lane changing path that allows the own vehicle to make the lane change from the current traveling lane of the own vehicle to the adjacent lane is set, when the making of the lane change is determined as being necessary on the basis of a preset condition upon traveling in the second driving assist mode. Upon executing the lane changing control that involves the steering control that is based on the lane changing path, the threshold is set to the first threshold that serves as a reference, in a case where the making of the lane change does not involve the preset urgency. In a case where the making of the lane change involves the preset urgency, the threshold is set to the second threshold that is greater than the reference first threshold. Under such circumstance, in a case where the maximum steering speed of the steering, to be performed on the basis of the lane changing path, is equal to or greater than the set threshold, i.e., the first threshold or the second threshold, the execution of the lane changing control is restrained or prohibited. Hence, it is possible to perform an appropriate lane change without giving an occupant a sense of discomfort.

For example, the first threshold, which prioritizes the ride quality to be felt by the driver, may be set as the threshold of the maximum steering speed, in a case where the urgency of making the lane change is low, such as in a case where the obstacle or any other obstructing factor is not present in the target traveling path within the set distance ahead of the own vehicle. Hence, it is possible to achieve the lane change that suppresses the generation of yaw moment, for example.

In contrast, for example, the second threshold may be set as the threshold of the maximum steering speed, in a case where the urgency of making the lane change is high, such as in a case where the obstacle or any other obstructing factor is present in the target traveling path within the set distance ahead of the own vehicle. The second threshold is greater than the first threshold, and may give more priority to the making of the lane change than the ride quality to be felt by the driver. This makes it possible to expand an allowable range of making the lane change. In other words, for example, it is possible to restrain the making of the transition to the automatic refuge mode. Hence, it is possible to perform an appropriate lane change without giving an occupant a sense of discomfort.

Accordingly, it is still possible to make the lane change to the adjacent lane in an urgent situation as long as the maximum steering speed is less than the second threshold, even in a case where the own vehicle misses a timing at which the making of the lane change based on the maximum steering speed of less than the first threshold is possible due to, for example, the presence of the parallel running vehicle 101 at the adjacent lane of the own vehicle traveling lane as illustrated by way of example in FIG. 4. In this example case, the lane change to the adjacent lane may be made following the passage of the parallel running vehicle 101, as denoted by a reference numeral 101' in FIG. 5.

(A) of FIG. 6 illustrates a temporal change in a steering wheel angle θ upon making the lane change at a timing illustrated in FIG. 4. The temporal change in the steering wheel angle θ illustrated in (A) of FIG. 6 is based on an assumption that the parallel running vehicle 101 is not present and the own vehicle is successful in starting the making of the lane change. In this case, it is possible to end the making of the lane change at or before a timing of crossing the obstacle 102 even when the steering speed (a derivative value of the steering wheel angle (dθ/dt)) is less than the first threshold.

(B) of FIG. 6 illustrates the temporal change in the steering wheel angle θ upon starting of the making of the lane change at a timing illustrated in FIG. 5. In an example case illustrated in (B) of FIG. 6, it may not be possible to end the making of the lane change at or before the timing of crossing the obstacle 102 and making of the lane change has to be abandoned accordingly as illustrated by a broken line in (B) of FIG. 6 if the steering speed is limited by the first threshold. However, changing the thresholds of the steering speed to the second threshold makes it possible to end the making of the lane change at or before the timing, i.e., makes it possible to execute the lane change without abandoning the making of the lane change.

Although some implementations of the technology have been described in the foregoing with reference to the accompanying drawings, the technology is by no means limited to the implementations described above. Various changes and modifications may be made to any implementation without departing from the scope of the technology. The technology is intended to include such modifications and alterations in so far as they fall within the scope of the appended claims or the equivalents thereof.

For example, a case where the making of the lane change involves the urgency is not limited to the situation where the obstacle is present in the target traveling path ahead of the own vehicle. The case where the making of the lane change involves the urgency may also encompass a situation where a pedestrian or any other factor runs into a road, or encompass any other situation where a situation can be considered as urgent.

Further, in the foregoing example implementation, the execution of the making of the lane change is restrained or prohibited in a case where the maximum steering speed upon the making of the lane change is equal to or greater than the first threshold or the second threshold, and the making of the lane change may be executed in a case where the maximum steering speed upon the making of the lane change is less than the first threshold or the second threshold. A condition for making the lane change, however, is not limited thereto. In an alternative example implementation, the execution of the making of the lane change may be restrained or prohibited in a case where the maximum steering speed upon the making of the lane change is greater than the first threshold or the second threshold, and the making of the lane change may be executed in a case where the maximum steering speed upon the making of the lane change is equal to or less than the first threshold or the second threshold.

The traveling ECU 22 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the traveling ECU 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the traveling ECU 22 illustrated in FIG. 1.

The invention claimed is:

1. A vehicle driving assist apparatus comprising:
a traveling environment recognizer configured to recognize a traveling environment of an own vehicle;
a target traveling path setting unit configured to set, on a basis of the traveling environment recognized by the traveling environment recognizer, a target traveling path onto a traveling lane of the own vehicle;
a traveling controller having an automatic driving mode, the automatic driving mode being configured to perform, on a basis of the target traveling path set by the target traveling path setting unit, a driving assist control that does not require a driver of the own vehicle to hold a steering wheel of the own vehicle;
a lane changing path setting unit configured to set a lane changing path and calculate a maximum steering speed, when the lane changing path setting unit determines, upon traveling in the automatic driving mode and on a basis of a preset condition, that making of a lane change is necessary, the lane changing path allowing the own vehicle to make the lane change from the traveling lane of the own vehicle to an adjacent lane, the maximum steering speed being a maximum speed of steering that is to be performed upon a steering control that causes the own vehicle to travel along the lane changing path;
a lane change controller configured to perform, on a basis of the lane changing path set by the lane changing path setting unit, a lane changing control that involves the steering control; and
a lane change urgency determining unit configured to determine, on a basis of information acquired by the traveling environment recognizer, urgency of making the lane change,
the lane change urgency determining unit being configured to change thresholds of the maximum steering speed to a second threshold that is greater than a first threshold when the urgency is determined by the lane change urgency determining unit as being high, the first threshold being a threshold of the maximum steering speed where the urgency is determined by the lane change urgency determining unit as not being high, and
the lane changing path setting unit being configured to restrain or prohibit execution of the making of the lane change when the maximum steering speed, upon the setting of the lane changing path by the lane changing path setting unit, is equal to or greater than the second threshold,
wherein the lane change urgency determining unit is configured to change the thresholds to the second threshold that is greater than the first threshold, through determining the urgency when an obstacle is present within a set distance ahead of the own vehicle in the target traveling path.

2. The vehicle driving assist apparatus according to claim 1, wherein the first threshold and the second threshold are set variably on a basis of a speed of the own vehicle.

3. A vehicle driving assist apparatus comprising:
a detector configured to recognize a traveling environment of an own vehicle; and
circuitry configured to
set, on a basis of the traveling environment recognized by the detector, a target traveling path onto a traveling lane of the own vehicle,
control traveling of the own vehicle on a basis of an automatic driving mode, the automatic driving mode being configured to perform, on a basis of the target traveling path, a driving assist control that does not require a driver of the own vehicle to hold a steering wheel of the own vehicle,
set a lane changing path when making of a lane change is determined, upon the traveling in the automatic driving mode and on a basis of a preset condition, as being necessary, the lane changing path allowing the own vehicle to make the lane change from the traveling lane of the own vehicle to an adjacent lane,
calculate a maximum steering speed when the making of the lane change is determined, upon the traveling in the automatic driving mode and on the basis of the preset condition, as being necessary, the maximum steering speed being a maximum speed of steering that is to be performed upon a steering control that causes the own vehicle to travel along the lane changing path,
determine, on a basis of information acquired by the detector, urgency of making the lane change,
change thresholds of the maximum steering speed to a second threshold that is greater than a first threshold when the urgency is determined as being high, the first threshold being a threshold of the maximum steering speed where the urgency is determined as not being high,
restrain or prohibit execution of the making of the lane change when the maximum steering speed, upon the setting of the lane changing path, is equal to or greater than the second threshold, and
perform, on a basis of the lane changing path, a lane changing control that involves the steering control when the maximum steering speed, upon the setting of the lane changing path, is less than the second threshold,
wherein the circuitry is further configured to change the thresholds to the second threshold that is greater than the first threshold, through determining the urgency when an obstacle is present within a set distance ahead of the own vehicle in the target traveling path.

* * * * *